(12) United States Patent
Armentrout et al.

(10) Patent No.: US 7,863,405 B2
(45) Date of Patent: Jan. 4, 2011

(54) REMOVAL OF RESIDUAL ACETALDEHYDE FROM POLYESTER POLYMER PARTICLES

(75) Inventors: Rodney Scott Armentrout, Kingsport, TN (US); Frederick Leslie Colhoun, Kingsport, TN (US); Michael Paul Ekart, Kingsport, TN (US); Bruce Roger DeBruin, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/018,358

(22) Filed: Dec. 21, 2004

(65) Prior Publication Data

US 2006/0047103 A1    Mar. 2, 2006

Related U.S. Application Data

(60) Provisional application No. 60/606,660, filed on Sep. 2, 2004.

(51) Int. Cl.
*C08G 63/02* (2006.01)

(52) U.S. Cl. .................. 528/272; 528/298; 528/300; 528/302; 528/308; 528/308.8; 528/491; 528/492; 528/503

(58) Field of Classification Search ............... 528/272, 528/298, 300, 302, 308, 308.6, 491, 492, 528/503; 428/402
See application file for complete search history.

(56) References Cited

U.S. PATENT DOCUMENTS

| | | | |
|---|---|---|---|
| 4,223,128 A | 9/1980 | Halek et al. | |
| 4,230,819 A | 10/1980 | Hauenstein et al. | |
| 4,764,323 A | 8/1988 | Al Ghatta | |
| 4,974,336 A * | 12/1990 | Hahn | 34/443 |
| 5,292,865 A | 3/1994 | Kerpes et al. | |
| 5,362,844 A | 11/1994 | Kerpes et al. | |
| 5,424,121 A | 6/1995 | Murakami et al. | |
| 5,648,032 A | 7/1997 | Nelson et al. | |
| 5,807,654 A | 9/1998 | Kubo et al. | |
| 6,245,844 B1 | 6/2001 | Kurian et al. | |
| 6,593,434 B1 | 7/2003 | Watanabe | |
| 2002/0036361 A1 * | 3/2002 | Borer et al. | 264/37.14 |
| 2003/0094723 A1 | 5/2003 | Ruppman et al. | |
| 2004/0236065 A1 | 11/2004 | Denis et al. | |
| 2005/0062186 A1 | 3/2005 | Fellinger | |
| 2005/0196566 A1 * | 9/2005 | Colhoun et al. | 428/35.7 |
| 2007/0073037 A1 | 3/2007 | Otto et al. | |

FOREIGN PATENT DOCUMENTS

| | | |
|---|---|---|
| BR | 200104067 | 8/2003 |
| BR | 200104068 | 8/2003 |
| DE | 4223197 | 1/1994 |
| DE | 4216960 | 5/1995 |
| DE | 4436046 | 4/1996 |
| EP | 0661326 * | 7/1995 |
| EP | 1 013 692 A2 | 12/1999 |
| FR | 2828199 | 2/2008 |
| GB | 787128 | 12/1957 |
| GB | 1058652 | 2/1967 |
| JP | 55069618 | 5/1980 |
| JP | 3-119178 A | 5/1991 |
| JP | 2001348425 | 12/2001 |
| TW | 321664 | 12/1997 |
| TW | 506976 | 10/2002 |
| TW | 541319 | 7/2003 |
| TW | 585880 | 5/2004 |
| TW | 585881 | 5/2004 |
| WO | 9961505 | 12/1999 |

OTHER PUBLICATIONS

International Search Report.
Search Report for Taiwan Application No. 094130024 completed on Oct. 5, 2008 (English translation).
European Search Report from PCT Application 05792582.8 - 2102 (PCT/US2005030531) dated Mar. 6, 2008.

* cited by examiner

*Primary Examiner*—Irina S Zemel
(74) *Attorney, Agent, or Firm*—Dennis V. Carmen; Bernard J. Graves, Jr.

(57) ABSTRACT

In one embodiment, there is provided a process comprising introducing polyester polymer particles containing residual acetaldehyde into a vessel at a temperature within a range of 130° C. to 195° C. to form a bed of particles within the vessel, flowing a gas through at least a portion of the particle bed, and withdrawing finished particles from the vessel having a reduced amount of residual acetaldehyde. In this process, it is not necessary to introduce a hot flow of gas at high flow rates otherwise required to heat up cool particles to a temperature sufficient to strip acetaldehyde. Rather, this process provides a benefit in that, if desired, gas introduced into the vessel at low flow rates and low temperatures can nevertheless effectively strip acetaldehyde in a reasonable time because the hot particles quickly heat a the gas to the particle temperature.

61 Claims, 3 Drawing Sheets

REMOVAL OF RESIDUAL ACETALDEHYDE FROM POLYESTER POLYMER PARTICLES

CROSS REFERENCE TO RELATED APPLICATIONS

This application claims the benefit of U.S. Provisional Application No. 60/606,660, filed Sep. 2, 2004, the entirety of which is hereby incorporated by reference.

FIELD OF THE INVENTION

This invention relates to the removal of residual acetaldehyde from polyester particles.

BACKGROUND OF THE INVENTION

A conventional process for the preparation of a polyethylene terephthalate based resin (PET) is characterized as a two stage process: a melt phase process which includes the esterification and polycondensation reactions, and a solid state polymerization process for increasing the molecular weight of the polymer in the solid state rather than in the melt. In a solid state polymerization process, PET is exposed to temperatures of 200-230° C. and a constant counter-current flow of nitrogen through the resin for a significant length of time. In such a conventional process, the molecular weight of the resin is increased in the melt phase up to an It.V. of about 0.55 to 0.65, followed by pelletization, after which the pellets are crystallized, and then solid state polymerized with an optional annealing step after crystallization.

In the melt phase, residual acetaldehyde is formed by degradation reactions occurring at the high temperatures experienced during the last stages of polycondensation. In a conventional process, attempting to further increase the molecular weight at these It.V. levels causes a marked increase in the formation of acetaldehyde. However, elevated temperatures in the melt phase are required to facilitate the polycondensation molecular weight building reactions. Accordingly, the polymer is made only to a low It.V. of about 0.55 to 0.60 dL/g in the melt phase, followed eventually by the further increase in the molecular weight of the polymer in the solid state.

During solid state polymerization, the particles are exposed to a counter-current flow of nitrogen gas to carry off ethylene glycol, water, and/or other condensates generated during polycondensation. The use of nitrogen also minimizes the oxidative degradation of the PET resin at solid stating temperatures. The nitrogen gas also helps safeguard against oxidation of antimony metal in resins containing reduced antimony as a reheat agent. Although the solid state polymerization provides a product with limited degradation products, the process adds a considerable amount of cost (conversion and capital) to the PET manufacturing process.

It would be desirable to eliminate the step of solid state polymerization by the manufacture of a polyester polymer resin in the melt phase having a high It.V. while minimizing the level of residual acetaldehyde, while also providing a crystallized particle to reduce the agglomeration of the particles in dryers feeding extruders for the formation of articles such as preforms and sheet.

SUMMARY OF THE INVENTION

In one embodiment, there is provided a process comprising introducing polyester polymer particles containing residual acetaldehyde into a vessel at a temperature within a range of 130° C. to 195° C. to form a bed of particles within the vessel, flowing a gas through at least a portion of the particle bed, and withdrawing finished particles from the vessel having a reduced amount of residual acetaldehyde. In this process, it is not necessary to introduce a hot flow of gas at high flow rates otherwise required to heat up cool particles to a temperature sufficient to strip acetaldehyde. Rather, this process provides a benefit in that, if desired, gas introduced into the vessel at low flow rates and low temperatures can nevertheless be effective to strip acetaldehyde in a reasonable time because the hot particles quickly heat the low flow of gas to the particle temperature.

In a variety of other embodiments, the polyester polymer forming the particles is polymerized in the melt phase to an It.V. of at least 0.72 dL/g, or the particles are partially crystallized before being exposed to the flow of gas, or the polyester polymer particles finished by the above method are dried in a dryer and fed to a melt processing zone without solid state polymerizing the particles, or the finished polyester polymer particles have a residual level of acetaldehyde of less than 5 ppm, or the process comprises a combination of any two or more of these features.

In yet another embodiment, there is provided a process comprising crystallizing polyester polymer particles to produce a hot stream of crystallized polyester polymer particles having an average degree of crystallinity of at least 25% and having a particle temperature in excess of 90° C., continuously feeding the hot stream of particles at a temperature of at least 130° C. into a vessel before the temperature of the hot stream drops below 50° C., feeding a flow of gas into the vessel and through the stream of particles in an amount sufficient to form a stream of finished polyester polymer particles having a reduced level of residual acetaldehyde relative to the level residual acetaldehyde prior to entry into the vessel. In this embodiment, heat energy imparted to particles during crystallization is harnessed as the heat energy transferred to the gas in the stripping vessel needed to reduce the level of residual acetaldehyde on or in the particles.

There is also provided a process comprising continuously feeding a stream of polyester polymer particles having a residual acetaldehyde level into a vessel, allowing the particles to form a bed and flow by gravity to the bottom of the vessel, continuously withdrawing finished particles from the vessel having a residual acetaldehyde level which is less than the residual acetaldehyde level of the stream of particles fed to the vessel and in no event greater than 10 ppm, continuously introducing a flow of gas into the vessel, and passing the flow of gas through the particles within the vessel, wherein the particles introduced into the vessel have an It.V. of at least 0.72 dL/g obtained without polymerization in the solid state. In this embodiment, particles having high It.V. and low levels of residual acetaldehyde are made without the need for solid state polymerization, thereby avoiding the costly solid state polymerization step.

In all of these embodiments, the use of costly acetaldehyde scavengers can also be avoided if desired.

These and other features of the invention are described in further detail below.

DETAILED DESCRIPTION OF THE INVENTION

The present invention may be understood more readily by reference to the following detailed description of the invention. It is to be understood that this invention is not limited to the specific processes and conditions described, as specific processes and/or process conditions for processing plastic articles as such may, of course, vary.

It must also be noted that, as used in the specification and the appended claims, the singular forms "a", "an" and "the" include plural referents. References to a composition containing "an" ingredient or "a" polymer is intended to include other ingredients or other polymers, respectively, in addition to the one named.

Ranges may be expressed herein as "within" or "between" or from one value to another. In each case, the end points are included in the range. Ranges expressed as being greater than or less than a value exclude the end point(s).

By "comprising" or "containing" or "having" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

Regardless of the context, the expression of a temperature means the temperature applied to the polymer unless otherwise expressed as the "actual" polymer temperature.

It is also to be understood that the mention of one or more method steps does not preclude the presence of additional method steps or intervening method steps between those steps expressly identified.

In the first embodiment of the invention, polyester polymer particles containing residual acetaldehyde are introduced into a vessel at a temperature within a range of 130° C. to 195° C. to form a bed of particles within the vessel, a flow of gas is allowed to pass through at least a portion of the particle bed, and finished particles are withdrawn from the vessel having a reduced amount of residual acetaldehyde.

In this first embodiment, a stream of polyester polymer particles is fed into the vessel at an elevated temperature. The elevated temperature is at least 130° C., or at least 140° C., or at least 150° C., or at least 160° C., and preferably under 195° C., or 190° C. or less. By feeding a stream of hot particles to the stripping vessel, costs associated with heating a flow of gas or providing for a high gas flow rate are avoided if desired. The hot particles provide the heat energy transferred to the gas to provide a gas temperature within the vessel sufficient to effectuate acetaldehyde stripping.

The polyester polymer particles introduced into the vessel contain a level of residual acetaldehyde. The invention reduces the amount of acetaldehyde present in the polyester polymer particles fed to the acetaldehyde stripping vessel. In one embodiment, the level of residual acetaldehyde present in the particles fed to the vessel is greater than 10 ppm, or greater than 20 ppm, or 30 ppm or more, or 40 ppm or more, and even 50 ppm or more.

Finished particles are particles treated by a flow of gas and having a level of residual acetaldehyde which is less than the level of residual acetaldehyde present on or in the particles fed to the vessel. Preferably, the level of residual acetaldehyde present on the finished particles is 10 ppm or less, or 7 ppm or less, or 5 ppm or less, or 3 ppm or less, or 2 ppm or less, or 1.5 ppm or less. In another embodiment, the reduction in acetaldehyde is at least 5 ppm, or at least 10 ppm, or at least 20 ppm, or at least 30 ppm. When a relative comparison is made, the amount of residual acetaldehyde can be measured according to standard techniques in the industry so long as the same test method is used. Otherwise, the test method used to determine the residual acetaldehyde content is ASTM F2013-00 "Determination of Residual Acetaldehyde in Polyethylene Terephthalate Bottle Polymer Using an Automated Static Head-Space Sampling Device and a Capillary GC with a Flame Ionization Detector".

The polyester polymer particles are exposed to a flow of gas across the particles in the particle bed within the vessel. The temperature of the gas as introduced into the vessel containing the bed of particles is desirably within a range of 0° C. to 200° C. At the preferred low gas flow rates described below, the gas temperature quickly equilibrates to the particle temperature in the bed within the vessel. For example, gas introduced at a temperature higher than the temperature of the particles will quickly equilibrate to the lower particle temperature at low gas flow rates relative to the flow rate of the particles introduced into the vessel. Likewise, gas introduced into the vessel at a temperature lower than the temperature of the particles will quickly equilibrate to the higher particle temperature at low gas flow rates relative to the flow rate of the particles introduced into the vessel. While it is possible to introduce gas at high temperature into the vessel, it is unnecessary and represents a waste of energy to heat the gas.

Therefore, it is preferred to introduce gas into the vessel at the low end of the temperature spectrum. In a more preferred embodiment, the gas is introduced into the vessel at a temperature of 70° C. or less, or 60° C. or less, or 50° C. or less, or 40° C. or less, and preferably at 10° C. or more, or 15° C. or more, or 20° C. or more, and most preferably is introduced at about the ambient air temperature.

Signs of oxidation and/or polycondensation reactions include an increase in the It.V. of the particles, or a change in L*, a*, and/or b* color, or a combination of two or more of these signs. To prevent polycondensing or oxidizing the polyester polymer to any significant extent, the temperature of the gas exiting the stripping vessel is preferably 195° C. or less.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to reduce the level of acetaldehyde on the particles fed to the vessel. Preferably, the gas introduction point in to the lower half of the bed height, and more preferably to the lower ¼ of the bed height. The gas flows through at least a portion of the particle bed, preferably through at least 50 volume % of the bed, more preferably through at least 75% of the particle bed volume.

Any gas is suitable for use in the invention, such as air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles, such as in a crystallizer, because nitrogen is inert to the oxidative reactions which would otherwise occur between many polyester polymers and ambient oxygen resulting in pellet discoloration. However, by keeping the process temperature low such that the gas exiting the vessel does not exceed 195° C., particle discoloration is minimized. In one embodiment, the gas contains less than 90 vol % nitrogen, or less than 85 vol % nitrogen, or less than 80 vol % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object of the invention is to strip acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel preferably insulated to retain heat. The gas inlet and the finished particle outlet is desirably located below the gas outlet and the particle inlet, preferably with the latter being toward the top of the vessel and the former being toward the bottom of the vessel. The gas is desirably introduced into the bed within the vessel at about ½ or ¼, of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the stripping zone containing the particles within the vessel. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle as the particles are fed to the vessel.

A suitable gas flow rate introduced into the vessel and passing through at least a portion of the particle bed is one which is sufficient to reduce the amount of residual acetaldehyde on the particles introduced into the vessel. However, to obtain one of the advantages of the invention, that is, lowering energy requirements on the gas and reducing capital costs on the gas, the gas flow rate at the gas inlet is low. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and should be kept sufficiently low to avoid unnecessary energy consumption by the gas pumps, fans, or blowers. Moreover, it is not desired to unduly cool the particles or dry particles, both objects which typically require the use of high gas flow rates to achieve. The gas flow rate in the process of the invention is preferably not any higher than 0.15 SCFM, or not higher than 0.10 SCFM, or not higher than 0.05 SCFM, or even not higher than 0.01 SCFM for every one (1) pound of charged particles per hour. The optimal flow rate is desirably set to provide the needed level of acetaldehyde removal without unnecessary energy consumption. Moreover, by providing low gas flow rates to the vessel, the gas is quickly heated within the vessel by the hot particles, thereby providing a hot gas throughout a substantial portion of the particle bed within the vessel effective to strip residual acetaldehyde from the particles.

Since the inlet gas pressure can be substantially atmospheric or at very low pressure, suitable devices to move the gas through the vessel are advantageously fans or blowers, although any suitable device for providing a motive force to a gas can be used.

If desired, the residence time of the particles can be shortened by increasing the temperature at which stripping occurs. This temperature is largely controlled by the temperature of the particles introduced into the vessel. The heat transfer from the particles rapidly heat the gas after it enters the vessel. At the point where the gas enters the vessel, the particles undergo a temperature change depending on the flow rate and temperature of the gas.

An additional advantage of this process is the capability to integrate the heat energy between different steps for producing polyester polymer particles in that the hot gas stream exiting the vessel can now be used to provide heat transfer to other suitable parts of a polyester polymer plant or as a source of combustion, such as a source of hot gas to a furnace to lower the energy requirements of the furnace.

The overall process for making polyester polymer resin, however, becomes much more economical if the crystallized particles introduced into the acetaldehyde stripping zone do not have to be heated up to temperature after crystallization. Allowing the crystallized particles to cool after crystallization, followed by heating the particles back up to the desired introductory temperature for acetaldehyde stripping, wastes energy. Accordingly, there is provided an integrated process wherein polyester polymer particles are crystallized in a crystallization zone, discharged as a stream of particles from the crystallization zone at particle temperatures in excess of 90° C., or in excess of 100° C., or in excess of 120° C., or in excess of 130° C., or even in excess of 140° C., and before the stream of particles is allowed to drop to a temperature below 50° C., or below 70° C., or below 90° C., or below 130° C., the stream of hot particles is fed to an acetaldehyde stripping zone in which a flow of gas is introduced at a temperature within a range of about 0° C. to 250° C., and the gas is passed through the stream of polyester polymer particles in an amount sufficient to form a stream of finished polyester polymer particles having a reduced level of the residual acetaldehyde.

The degree of crystallinity of the polyester polymer particles is not particularly limited. It is preferred to employ crystallizable polyester polymers. The process of the invention is capable of producing high It.V. polyester polymer particles having low levels of residual acetaldehyde ready to be shipped or fed to a dryer feeding an injection molding machine or extruder for making an article, such as sheet or preforms. To reduce the tendency of the particles to stick to each other in the dryer, it is preferred to feed the dryer with partially crystallized particles. Therefore, in one embodiment, the polyester polymer particles fed to the acetaldehyde stripping zone are partially crystallized, preferably to a degree of crystallinity of at least 25%, or at least 30%, or at least 35%, and up to about 60%. The particles can be crystallized to a higher degree of crystallinity, but satisfactory results in decreasing the level of particles agglomeration can be obtained within these ranges.

The pressure within the vessel is not particularly limited. The vessel can be maintained close to ambient conditions, with a slight amount of pressure to force gas into the vessel. Within the vessel, a slight pressure gradient will exist if hot particles are introduced from the air inlet to the air outlet. A pressure gradient also exists due to the pressure drop from friction of the gas on the pellets. The pressure within the vessel measured at the gas inlet close to the gas inlet/vessel junction ranges from about 0 psig to about 30 psig, preferably from about 0 psig to about 10 psig, or from about 0 psig to 5 psig.

The residence time of the particles in contact with the flow of gas within the vessel is also not particularly limited. Suitable residence times range from 2 hours, or from 10 hours, or from 18 hours, and up to about 48 hours, or 36 hours, or 30 hours.

The process of the invention provides the flexibility of adjusting a number of variables to maintain a constant particle It.V. and to mitigate discoloring the particles. The process variables include the, particle introductory temperature, the particle residence time, the gas flow rate, and the gas introductory temperature. Optimal process conditions to minimize oxidation reactions, discoloration, maintain the It.V. of the particles, and remove acetaldehyde while keeping the production costs low are to introduce the gas at ambient temperature, to feed particles within a range of 150° C. to 170° C. into a vertical cylindrical vessel at an air flow rate ranging from 0.002 SCFM to 0.009 SCFM per 1 lb of PET. The size of the vessel is such that the residence time of the pellets averages about 10 to 24 hours.

The process of the invention provides an advantageous low cost means for reducing residual acetaldehyde from a polyester polymer having a high molecular weight and high It.V., such as at least 0.70 dL/g. The low level of acetaldehyde may also be obtained without the need for adding an acetaldehyde scavenging compound into the melt phase for the production of the high It.V. polyester polymer. Thus, there are provided several additional embodiments comprising:
1. A polyester polymer resin having an It.V. of at least 0.70 dL/g and 5 ppm or less acetaldehyde without solid state polymerizing the polymer;
2. A polyester polymer resin made in a melt phase to an It.V. of at least 0.70 dL/g without adding an acetaldehyde scavenger to the polymer during melt phase production, the polyester polymer having an acetaldehyde content of 5 ppm or less acetaldehyde, and preferably an acetaldehyde content of 5 ppm or less without solid state polymerizing the polymer.

In conventional polyester production technology, the polyester polymer is polymerized in the melt to a relatively low It.V. of 0.5 to about 0.65 dL/g partly because a further increase in It.V. results in the build up of unacceptably high levels of acetaldehyde. As a result, the molecular weight of the polymer is further advanced in the solid state rather than in a melt to avoid further increased, and to actually decrease, the levels of residual acetaldehyde. With the process of the invention, however, to solid state polymerization process may be avoided altogether while obtaining a particle with low residual acetaldehyde. Thus, there is also provided another embodiment where a stream of polyester polymer particles having a residual acetaldehyde level are fed continuously into a vessel, allowed to form a bed and flow by gravity to the bottom of the vessel, continuously withdrawn from the vessel as finished particles having a residual acetaldehyde level which is less than the residual acetaldehyde level of the stream of particles fed to the vessel and in no event greater than 10 ppm, continuously introducing a flow of gas into the vessel, and passing the flow of gas through the particles within the vessel, wherein the particles introduced into the vessel have an It.V. of at least 0.72 dL/g obtained without polymerization in the solid state.

The finished particles are directly or indirectly packaged into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or air. Examples include railcars, semi-containers, Gaylord boxes, and ship hulls.

One of the advantages of the invention is that the stripping process is conducted at a temperature low enough where the polymer does not polycondense and build up molecular weight. Thus, in an embodiment of the invention, process conditions are established such that the It.V. differential measured as the It.V. of the finished polyester polymer and the It.V. of the polyester polymer fed to the acetaldehyde stripping zone, is less than +0.025 dL/g, or +0.020 dL/g or less, or +0.015 dL/g or less, or +0.010 dL/g or less, and preferably −0.02 dL/g or more, or −0.01 dL/g or more, and most preferably close to 0, within experimental error.

The It.V. values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where
$\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where
$\eta_{int}$=Intrinsic viscosity
$\eta_r$=Relative viscosity=$t_s/t_o$
$\eta_{sp}$=Specific viscosity=$\eta_r - 1$ Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (ItV or $\eta_{int}$) may be estimated using the Billmeyer equation as follows:

$$\eta_{int} = 0.5[e^{0.5 \times Corrected\ IhV} - 1] + (0.75 \times Corrected\ IhV)$$

There is also provided an embodiment where the process conditions are established such that the L* color value differential measured as (L* finished polyester polymer−L* of the particle feed)

is 5 or less, or 3 or less, or 2 or less, and desirably greater than −3, or greater than −2, or greater than −1. Preferred L* value differentials are close to 0. While positive changes where the L* is actually increased in the finished polymer are acceptable and even desirable, consideration should be taken into account as to the reason why the L* is increased. In some cases, L* can increase due to the oxidation of a metal, which may or may not be a significant consideration depending upon the function of the metal. If the metal is present as a reheat additive, its function as a reheat additive will diminish if oxidized even though the L* color brightness increases. In this case, the amount of metal present can be increased proportionately to allow for the presence of sufficient elemental metal to act as a reheat additive, but in many cases, the amount of metal remaining after its oxidation to function as a reheat agent is a balance against the additional brightness obtained as indicated by the increase in L*. The particular end use application and cost will control the degree of increase in L* and reduction in reheat which can be tolerated. However, if the function of the metal is already served or not impacted by an oxidation reaction, then an increase in L* to any degree may actually be desired.

Another advantage of the invention is that the stripping process is conducted under conditions to prevent the polymer from exhibiting a significant change in color in the direction toward more yellowness. Accordingly, there is provided another embodiment in which process conditions are established such that the b* color value of the finished polyester polymer is less than the b* color value of the polyester polymer fed to the acetaldehyde stripping zone, or is unchanged, or is greater than by not more than 1.0, but is preferably unchanged or less. For example, a finished particle b* color value of −2.1 is less than a feed particle b* color value of −1.5. Likewise, a finished b* color value of +2.0 is less than a feed particle b* color value of +2.7. b* color value shifts in the direction toward the blue end of the b* color spectrum is desirable. In this way, the process conditions do not add a substantially greater yellow hue to the particles.

The measurements of L*, a*, and b* color values are conducted according to the following methods. The instrument used for measuring color should have the capabilities of a HunterLab UltraScan XE, model U3350, using the CIELab Scale(L*, a*, b*), D65 (ASTM) illuminant, 100 observer, integrating sphere geometry. Particles are measured in RSIN reflection, specular component included mode according to ASTM D6290, "Standard Test Method for Color Determination of Plastic Pellets". Plastic pellets are placed in a 33-mm path length optical glass cell, available from HunterLab, and allowed to settle by vibrating the sample cell using a laboratory Mini-Vortexer (VWR International, West Chester, Pa.). The instrument for measuring color is set up under ASTM E1164 "Standard Practice for Obtaining Spectrophotometric Data for Object-Color Evaluation." Color is determined on a sample by using its absolute value–the value determined by the instrument.

The measurements of % crystallinity are obtained from differential scanning calorimetry according to the following equation:

$$\% \text{ crystallinity} = [\Delta Hm/\Delta Hm°] \cdot 100\%$$

where $\Delta Hm$ is the heat of melting of the polymer determined by integrating the area under the curve (Joule/gram) of the melting transition(s) observed during the first scan of 25° C. to 300° C. at 20° C. per minute in a Perkin Elmer differential scanning calorimeter and $\Delta Hm°$ is a reference value of 140.1 J/g and represents the heat of melting if the polyethylene terephthalate is 100% crystalline.

The shape of the polyester polymer particles is not limited, and can include regular or irregular shaped discrete particles without limitation on their dimensions, including, stars, spheres, spheroids, globoids, cylindrically shaped pellets, conventional pellets, pastilles, and any other shape, but particles are distinguished from a sheet, film, preforms, strands or fibers.

The number average weight (not to be confused with the number average molecular weight) of the particles is not particularly limited. Desirably, the particles have a number average weight of at least 0.10 g per 100 particles, more preferably greater than 1.0 g per 100 particles, and up to about 100 g per 100 particles.

The polyester polymer of this invention is any thermoplastic polyester polymer. A polyester thermoplastic polymers of the invention are distinguishable from liquid crystal polymers and thermosetting polymers in that thermoplastic polymers have no ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer desirably contains alkylene terephthalate or alkylene naphthalate units in the polymer chain. More preferred are polyester polymers which comprise:
(a) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 60 mole %, or at least 80 mole %, of the residues of ethylene glycol or propane diol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its dimethyl ester to produce an ester monomer and/or oligomers, which are then polycondensed to produce the polyester. More than one compound containing carboxylic acid group(s) or derivative(s) thereof can be reacted during the process. All the compounds containing carboxylic acid group(s) or derivative(s) thereof that are in the product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the product refers to the portion of said compound(s) which remains in the oligomer and/or polymer chain after the condensation reaction with a compound(s) containing hydroxyl group(s).

More than one compound containing hydroxyl group(s) or derivatives thereof can become part of the polyester polymer product(s). All the compounds containing hydroxyl group(s) or derivatives thereof that become part of said product(s) comprise the hydroxyl component. The mole % of all the compounds containing hydroxyl group(s) or derivatives thereof that become part of said product(s) add up to 100. The residues of hydroxyl functional compound(s) or derivatives thereof that become part of said product refers to the portion of said compound(s) which remains in said product after said compound(s) is condensed with a compound(s) containing carboxylic acid group(s) or derivative(s) thereof and further polycondensed with polyester polymer chains of varying length.

The mole % of the hydroxyl residues and carboxylic acid residues in the product(s) can be determined by proton NMR.

In another embodiment, the polyester polymer comprises:
(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole %, or at least 92 mole %, or at least 96 mole % of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as such as isophthalic acid, naphthalane dicarboxylic acid, cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

Once the polyester polymer is manufactured in the melt phase polymerization, it is solidified. The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer may also be crystallized if desired as noted above. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

In each of these embodiments, the articles of manufacture are not limited, and include sheet and bottle preforms. The bottle preforms can be stretch blow molded into bottles by conventional processes. Thus, there is also provided in an embodiment the bottles made from the particles of the invention, or made by any of the processes of the invention, or made by any conventional melt processing technique using the particles of the invention.

Not only may containers be made from particles made according to the process of this invention, but other items such as sheet, film, bottles, trays, other packaging, rods, tubes, lids, filaments and fibers, and other molded articles may also be manufactured using the polyester particles of the invention. Beverage bottles made from polyethylene terephthalate suitable for holding water or carbonated beverages, and heat set beverage bottle suitable for holding beverages which are hot filled into the bottle are examples of the types of bottles which are made from the crystallized pellets of the invention.

Figure 1:
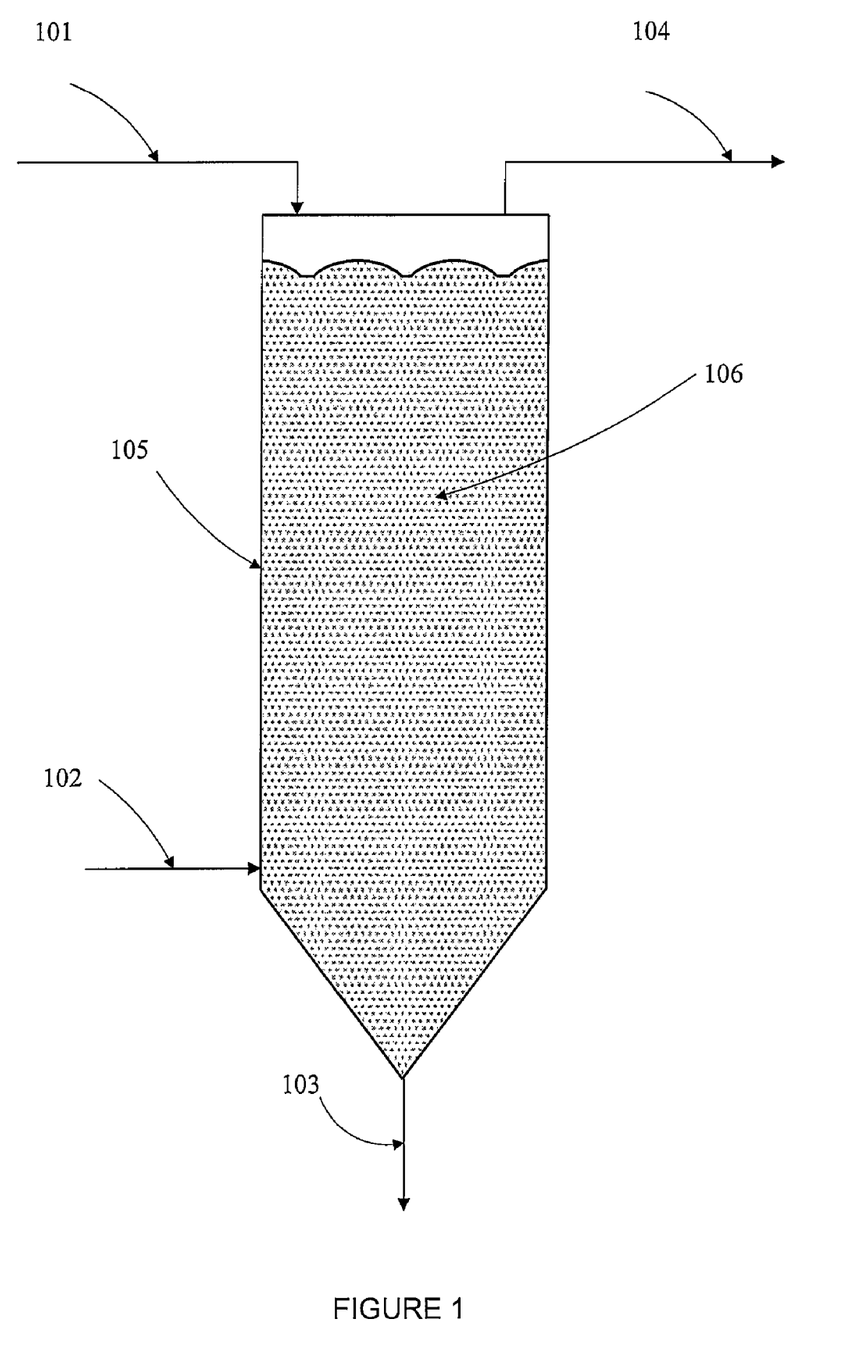
FIG. 1 illustrates an acetaldehyde stripping vessel.
Figure 2:
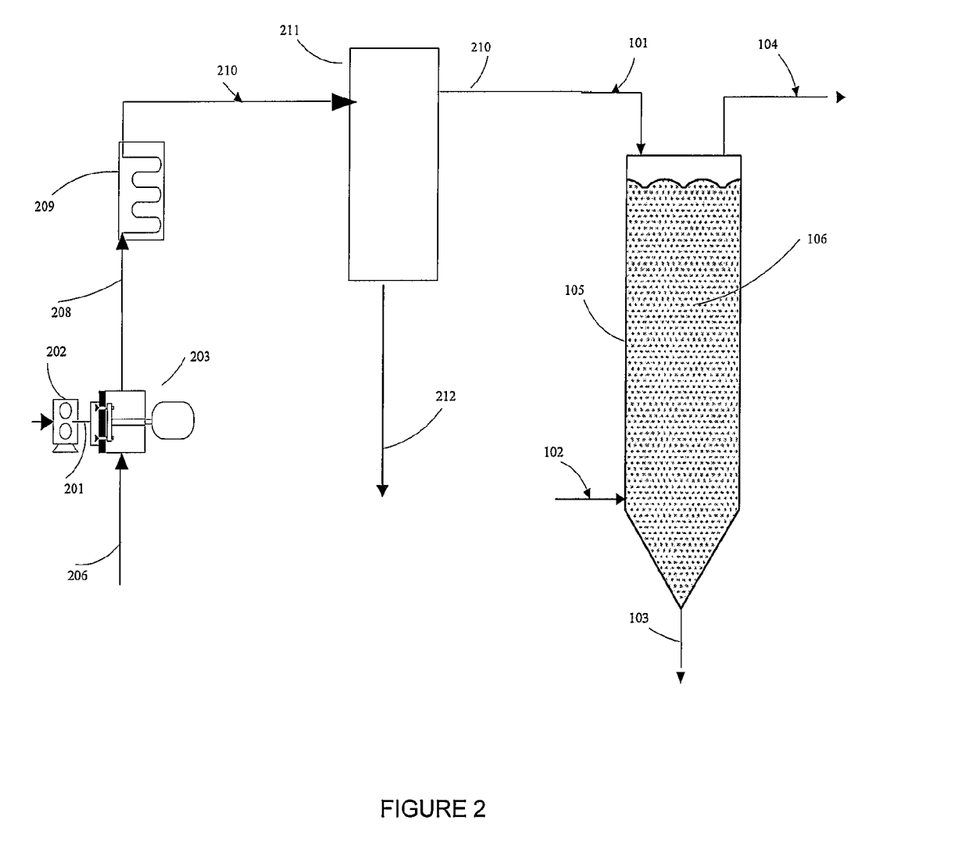
FIG. 2 is a process flow diagram for crystallizing and stripping acetaldehyde from polyester polymer particles.

FIGS. 1 and 2 illustrate non-limiting process flow embodiments describing how the invention could be practiced.

In FIG. 1, a stream of hot crystalline polyester particles containing a level of residual AA greater than 10 ppm is introduced into a vessel 105 through particle inlet pipe 101. The particles form a bed 106 within the vessel 105 and move downward toward the vessel outlet 103 to form a stream of crystalline polyester particles having a reduced level of residual acetaldehyde of 10 ppm or less. A stream of gas is fed into the vessel through a side inlet 103 toward the lower ⅓ of the vessel height. Other suitable locations, not illustrated, include a bottom inlet closer toward the particle outlet 103, or a top feed. After picking up acetaldehyde from the particles, the gas is removed from the vessel 105 through gas outlet 104. The location of 103 and 104 relative to each other are preferably chosen so that gas flows across the majority of the particles in the bed 106.

The polyester particle stream flowing into particle inlet 101 are at a temperature of 120 to 180° C., and contain more than 10 ppm acetaldehyde. The stream rate of the particles is not limited as this process will be effective at a very wide range of rates. The mass of the particles in the bed 106 is selected to give the desired residence time for particles in the vessel 105. For example, if the rate of particles in stream 101 is 10,000 lbs/hr, and an average residence time of 20 hours is desired, the mass of particles in the bed 106 should be (10,000 lb/hr) (20 hr)=200,000 lbs. The size of the vessel 105 is sufficient to contain the bed 106.

Preferably the vessel 105 is insulated to prevent unnecessary heat losses. The average temperature of the particles in the bed 106 is within 120° C. and 180° C. and will depend primarily on the temperature, rate, and feed location of particle stream though particle inlet 101, the temperature, rate, and feed location of gas through inlet 102, and heat losses from the vessel 105. At low inlet gas rates, the gas stream will not have a large impact on the average temperature of particles in the bed 106.

Particles are removed 106 from the vessel containing less than 10 ppm acetaldehyde. The temperature of stream 103 is not limited and depends primarily on the temperature and rate of incoming particles 101 the temperature and rate of inlet gas 102, and heat losses from the vessel 105. The level of acetaldehyde in stream 103 depends primarily on the rate and acetaldehyde content of particles in inlet stream 101, the temperature and mass of particles in bed 106, the rate and temperature of gas 102, fed to the vessel, and the rate at which acetaldehyde is chemically generated in the polymer during the stripping process. At steady state, the rate of pellet removal 106 is on average the same as the rate of particles at the inlet 101. One skilled in the art is aware that these rates may be intentionally set differently to adjust the mass of the bed 106.

The rate at the gas inlet 102 is preferably greater than 0.0001 SCFM per lb/hr of particles 101 fed to the stripper. There is a balance between having sufficient gas to dilute the acetaldehyde and ensure a large driving force for acetaldehyde to leave the polymer particles, versus the cost of providing higher gas rates to the stripper. At the low gas rates that are preferred, the temperature of the gas is not limited as it does not have a large impact on the temperature of particles in the bed 106. At high gas flow rates, for example 1 lb/hr of air in stream 102 per 1 lb/hr of particles in stream 101 the gas temperature can have a significant impact on the temperature of bed 106 and must be chosen to give a bed temperature between 120 and 180° C. The inlet gas stream 102, is preferably air substantially free of acetaldehyde.

The rate at the gas outlet 104 is on average the same as the average rate of the gas inlet 102. The temperature is not limited, and will depend primarily on the temperature of the bed 106 through which the gas has last flowed before exiting the vessel. The concentration of acetaldehyde at the gas outlet 104, will depend on the amount of acetaldehyde removed from the polymer particles and the gas flow rate.

FIG. 2 is another non-limiting example of an embodiment in which the heat energy from the particles imparted during crystallization is integrated with the energy required for stripping AA. As illustrated in FIG. 2, a molten polyester polymer stream is fed to an underfluid cutter 203 through line 201 using a gear pump 202 as the motive force. While an underfluid cutter is illustrated, any conventional type of pelletizer can be employed to make pellets which are eventually fed to a crystallizer. The source of the molten polymer may be from pellets fed through an extruder to the gear pump 202 or from the melt phase high polymerizer or finisher (not shown) fed to the gear pump 202. The liquid medium is fed into cutter 203 through a feed pipe 206 into the cutter 203. A suitable liquid medium comprises water entering the housing at a fluid velocity of 1 ft/s to 8 ft/s, preferably 1 ft/s to 4 ft/s. The flow of liquid medium through the cutter 203 sweeps the cut particles away from the cutter and into the outlet pipe 208 for transport into a crystallizer 209.

As illustrated, the crystallizer 209 is an underfluid crystallizer having a high liquid temperature in which the liquid is kept under a pressure equal to or greater than the vapor pressure of the liquid to keep the fluid in the liquid state. Crystallizer 203 comprises of a series of pipes in a coil or stacked to form a three dimensional box or any other shape, including a long linear tube. The liquid (e.g. water) temperature at the outlet pipe 208 and through the crystallizer pipes 209 is above the $T_g$ of the particles, and preferably at any temperature within a range of greater than 100° C. to 190° C., and more preferably from 140 to 180° C. While underfluid crystallizer is illustrated, any conventional crystallizer is suitable. For example, a suitable crystallization method includes passing a countercurrent gas of hot nitrogen or air or both at a gas feed temperature of 160° C. to 220° C. through a bed of solid pellets agitated by the gas flow or by mechanical agitation, or alternatively, the heat source to the pellets is provided by heat transfer through the jacketed walls of a vessel. The particles attain a degree of crystallization ranging from 20% to about 65%, or about 25% to about 50% after discharge from the crystallizers.

After flowing through the crystallization pipes, the crystallized particles are fed through pipe 210 to a particle/liquid separator 211. A separator 211 is not needed, however, if conventional crystallization techniques are applied which use a gas or the walls of a vessel as the heat transfer source. The method or equipment for separating particles from liquid is not limited. Examples of suitable separators include centrifugal dryers, solid or screen bowl centrifuges, pusher centrifuges, or simple filters or screens into which the particle/liquid slurry is fed with the liquid flowing through the screen and out through liquid outlet pipe 212. The liquid in pipe 212 may optionally be re-circulated as a source of liquid for the feed into the underfluid cutter.

The particles are discharged from separator 211 through particle outlet pipe 213 and fed into vessel 105, the AA stripping vessel. In the event that a conventional crystallizer is used, the particles can be fed directly or indirectly from the crystallizer to the AA stripping vessel 105. The particles fed to the vessel 105 have high heat energy imparted by the crystallizer 209. The heat energy in the particles is used as the source of heat transferred to the gas supplied to the vessel 105 through line 103 which flows through the particle bed 106.

In this embodiment, the polyester particle stream is fed into vessel 105 at a temperature of at least 50° C. The crystallized particle stream discharged from the separator 211, or discharged from a conventional crystallizer, is typically at a temperature in excess of 90° C., or in excess of 120° C., or in excess of 130° C. Between the conventional crystallizer, or the separator 211, and the stripping vessel 105, the particles may cool somewhat through heat losses to the piping, or heat losses in the separator 211, or within optional equipment between the separator 211 and the vessel 105. Between the discharge from the crystallizer, whether conventional or as illustrated in FIG. 2 as 109, the temperature of the crystallized particles preferably does not drop below 50° C., or does not drop below 75° C., or does not drop below 90° C., or does not drop below 100° C., or does not drop below 110° C. In this embodiment, the stream of crystallized particles is fed into the stripping vessel 105 through particle inlet pipe 101 at a temperature of at least 130° C., while a flow of gas is fed through gas inlet 102 and through the bed of crystallized particles 106. The feed temperature of at least 130° C. is preferred because at lower temperatures, the residence time of the particles in the vessel is undesirably long. Finished particles are discharged through particle outlet line 103 and the gas is discharged preferably toward the top of the vessel 105 through a gas discharge line 104.

In the event that the temperature of the crystallized particles from a crystallizer or from a liquid/solid separator drops below 130° C., the stream of crystallized particles can be reheated to at least 130° C. by any conventional heating means. Even though thermal energy may be to be applied to reheat the stream of crystallized particles, the integrated process requires the application of less energy than would be required if, for example, the particle temperature falls to ambient temperature. Suitable heating devices include preheaters or thermal screws.

Experiment Set 1

This set of experiments illustrates the effects of time and temperature on the residual acetaldehyde, molecular weight, color, and crystallinity of the polyester polymer particles.

Three different polyethylene terephthalate based polymers representing three different geometries were placed in a fluidized bed reactor and exposed to either 150° C., 160° C., or 185° C. temperatures and a low air flow rate for at least 24 hours. More specifically, the experiments were conducted in a column reactor comprised of a modified chromatography column to allow for the introduction of a gas stream over the polymer particles and to regulate the temperature of the polymer particles, a round bottom flask, and a condensor.

Figure 3:
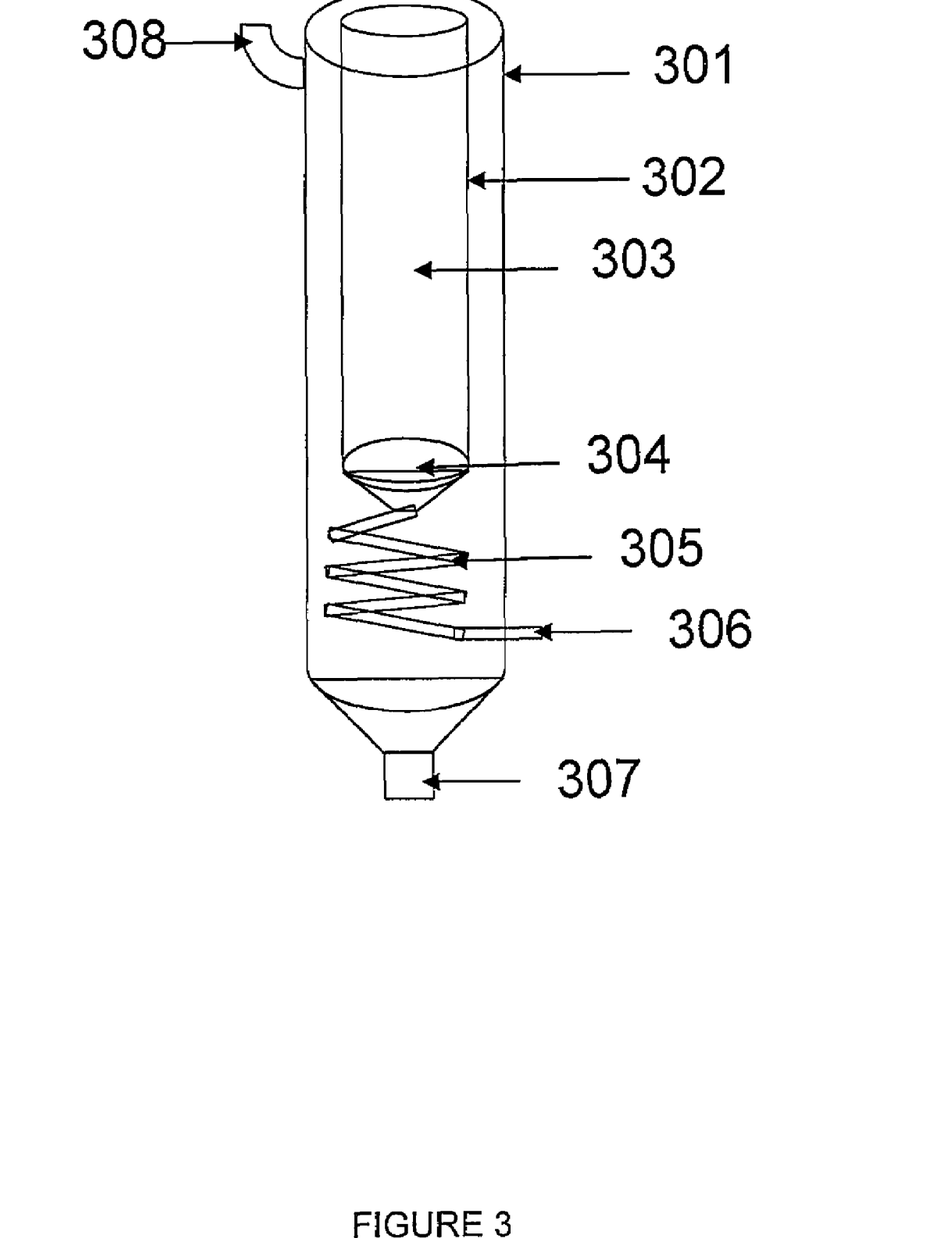
FIG. 3 illustrates a lab model of a modified chromatograph column used to conduct experiments.

The column reactor is illustrated in FIG. 3. The outside glass wall 301 contains an inside glass wall 302 within which is a chamber 303 for polymer particles. At the bottom of the chamber 303 is a fritted glass support 304, through which is fed a gas at a gas inlet port 306 flowing through a coil of glass tubing 305. On the outside glass wall is provided a connector 307 for a round bottom flask and a connector 308 for a condenser.

The temperature of the column reactor, polymer particles within the column and the gas flowing over the polymer particles in the column is regulated by refluxing a suitable solvent in a round bottom flask connected to the column at inlet 307. A condenser is attached to the column at 8 to allow for the refluxing solvent to be reclaimed to the reactor. Cumene (b.p.=150° C.), cyclohexanol (b.p.=160° C.) or diethyl octoate (b.p.=185° C.) was used as the temperature regulating solvent.

The experiments were conducted in two stages by charging the vessel with 1.5 pounds (680 g) of a partially crystallized PET resin. In the first set of experiments, the resin was charged to the vessel at 7:00 a.m., and about 60 grams samples were collected at each time interval indicated on Table 1. In a second set of experiments, the resin was charged to the vessel at 5:00 p.m., and about 60 grams samples were collected at each time interval as indicated on Table 1 below. The samples were submitted for residual acetaldehyde analysis using the test method as described above, for inherent viscosity test measurements as described above, to color (reflectance) analysis as described above, and for % crystallinity analysis as described above.

Within each set of experiments, three different runs were made. In the first run, a polyester polymer thermally crystallized at 175° C. to a degree of crystallinity of 33% and having an It.V. of 0.816 was used ("Polymer 1"). In the second run, a polyester polymer crystallized with a roll processing unit to a degree of crystallinity of 35.7% and having an It.V. of 0.802 was used ("Polymer 2"). In the third run, a polyester polymer crystallized underwater to a degree of crystallinity of 30.5% and having an It.V. of 0.820 was used ("Polymer 3"). In each case, the polyester polymer was a polyethylene terephthalate based polymer having 2.0 mol % (of total dicarboxylic acid content) isophthalic acid modification. The average particle dimensions were about 1.84×2.68×2.43 mm, 2.45×3.09×3.90 mm, and 2.75 mm diameter, respectively.

Within the second set of experiments, one run was performed using Polymer 1, except the second experiment was performed at the higher temperature of 160° C.

Within the third set of experiments, three runs were performed using the same polymers as in the first set of experiments, except that the third set of experiments was performed at the higher temperature of 185° C.

The air flow for each experiment was set at 0.0067 SCFM using ambient plant air. The amount of solvent charged to the round bottom flask connected to the column reactor was 1000 ml. The residence time of the particles was varied and are detailed in Tables 1 through 7 in each case. The polymer charge was 1.5 lbs in each case. The polymer was added to the column reactor after the column had reached the target temperature of 150° C., 160° C., or 185° C., depending upon the solvent used in each set of experiments. The time at which the polymer was added to the vessel was set as the start time for the experiment (Time=0 hr). The temperature of the polymer particles was measured by a thermocouple placed on the fritted glass support (4 in FIG. 3) The results of the experiments run at 150° C. using Polymer 1 are reported on Table 1. The results of the experiments run at 160° C. using Polymer 1 are reported on Table 2. The results of the experiments run at 185° C. using Polymer 1 are reported on Table 3. The results of the experiments run at 150° C. using Polymer 2 are reported on Table 4. The results of the experiments run at 185° C. using Polymer 2 are reported on Table 5. The results of the experiments run at 150° C. using Polymer 3 are reported on Table 6. The results of the experiments run at 185° C. using Polymer 3 are reported on Table 7.

TABLE 1

Polymer 1, 150° C., 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 45.23 | 0.811 | 65.78 | −1.345 | −3.06 | 32.6 |
| 1.00 | 34.91 | 0.803 | 66.1 | −1.33 | −3.20 | 34.2 |
| 2.00 | 32.28 | 0.815 | 66.33 | −1.32 | −3.29 | 32.3 |
| 3.00 | 25.43 | 0.812 | 66.48 | −1.32 | −3.38 | 33.9 |
| 3.83 | 19.98 | 0.810 | 66.44 | −1.23 | −3.37 | 31.9 |
| 6.33 | 10.95 | 0.812 | 66.41 | −1.27 | −3.23 | 31.3 |
| 8.00 | 7.26 | 0.821 | 66.76 | −1.22 | −3.28 | 34.5 |
| 9.50 | 6.00 | 0.819 | 66.90 | −1.25 | −3.25 | 38.3 |
| 14.00 | 5.37 | 0.803 | 66.69 | −1.18 | −3.29 | 33.5 |
| 16.00 | 3.39 | 0.813 | 67.37 | −1.19 | −3.41 | 30.6 |
| 18.00 | 2.95 | 0.816 | 66.35 | −1.16 | −3.17 | 32.5 |
| 20.50 | 2.63 | 0.816 | 67.35 | −1.15 | −3.36 | 32.4 |
| 22.58 | 2.54 | 0.816 | 67.29 | −1.18 | −3.46 | 34.8 |
| 23.50 | 2.50 | 0.821 | 67.10 | −1.15 | −3.43 | 35.7 |
| 23.75 | 2.45 | 0.829 | 66.86 | −1.1933 | −3.21 | 33.7 |

TABLE 2

Polymer 1 at 160° C., 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 57.02 | 0.831 | 65.29 | −1.37 | −3.37 | 28.42 |
| 1.50 | 47.40 | 0.831 | 66.08 | −1.31 | −3.70 | 26.55 |
| 2.50 | 28.95 | 0.823 | 66.85 | −1.28 | −3.78 | 28.52 |
| 3.50 | 20.55 | 0.821 | 66.38 | −1.21 | −3.60 | 27.57 |
| 4.83 | 12.51 | 0.813 | 66.48 | −1.18 | −3.48 | 27.44 |
| 6.75 | 7.16 | 0.822 | 67.07 | −1.20 | −3.73 | 28.99 |
| 8.58 | 5.22 | 0.822 | 65.99 | −1.09 | −3.41 | 30.21 |
| 23.75 | 3.00 | 0.810 | 66.50 | −1.06 | −3.40 | 30.06 |

TABLE 3

Polymer 1 at 185° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 43.36 | 0.821 | 65.98 | −1.35 | −3.12 | 34.24 |
| 1.00 | 34.90 | 0.810 | 65.49 | −1.30 | −3.12 | 33.15 |
| 2.00 | 13.78 | 0.809 | 67.43 | −1.20 | −3.36 | 32.95 |
| 3.00 | 8.13 | 0.818 | 67.69 | −1.13 | −3.21 | 31.78 |
| 4.00 | 6.85 | 0.820 | 66.94 | −1.07 | −3.02 | 30.77 |
| 5.50 | 6.44 | 0.808 | 67.52 | −0.99 | −2.90 | 37.23 |
| 7.50 | 5.13 | 0.826 | 67.16 | −0.96 | −2.36 | 36.85 |

TABLE 3-continued

Polymer 1 at 185° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 15.00 | 2.92 | 0.813 | 68.68 | −0.73 | −2.05 | 38.99 |
| 17.17 | 2.40 | 0.827 | 68.82 | −0.71 | −1.77 | 40.49 |
| 18.50 | 2.21 | 0.845 | 68.46 | −0.66 | −1.69 | 38.36 |
| 20.00 | 1.78 | 0.858 | 69.36 | −0.63 | −1.68 | 39.68 |
| 21.33 | 1.71 | 0.857 | 69.47 | −0.67 | −1.53 | 38.05 |
| 23.00 | 1.48 | 0.852 | 68.56 | −0.55 | −1.28 | 40.64 |
| 23.17 | 1.25 | 0.826 | 69.47 | −0.6 | −1.34 | 38.53 |

TABLE 4

Polymer 2 at 150° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 7.52 | 0.800 | 55.43 | −0.97 | −0.06 | 36.18 |
| 2.00 | 6.08 | 0.809 | 55.84 | −1.00 | −0.23 | 40.91 |
| 3.00 | 5.11 | 0.807 | 56.03 | −1.07 | −0.21 | 34.31 |
| 4.42 | 4.19 | 0.810 | 56.42 | −1.02 | −0.31 | 41.44 |
| 6.00 | 3.47 | 0.806 | 56.02 | −1.04 | −0.31 | 45.63 |
| 7.58 | 2.94 | 0.812 | 56.47 | −1.03 | −0.56 | 40.89 |
| 9.42 | 2.53 | 0.797 | 56.91 | −0.95 | −0.45 | 41.97 |
| 14.00 | 1.71 | 0.793 | 56.59 | −0.94 | −0.18 | 36.38 |
| 16.00 | 1.61 | 0.804 | 55.16 | −0.95 | −0.48 | 52.75 |
| 18.00 | 1.38 | 0.801 | 56.5 | −0.98 | −0.47 | 42.43 |
| 20.08 | 1.24 | 0.803 | 56.32 | −0.97 | −0.41 | 37.04 |
| 22.00 | 1.22 | 0.797 | 56.43 | −0.95 | −0.48 | 41.59 |
| 23.92 | 1.14 | 0.800 | 57.17 | −0.98 | −0.58 | 42.00 |
| 24.50 | 1.04 | 0.804 | 56.50 | −0.95 | −0.45 | 37.18 |
| 39.25 | 0.86 | 0.797 | 56.35 | −0.94 | −0.47 | 47.70 |

TABLE 5

Polymer 2 at 185° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 20.67 | 0.810 | 55.49 | −0.80 | −0.32 | 35.20 |
| 1.00 | 5.415 | 0.799 | 56.53 | −0.85 | −0.59 | 35.67 |
| 1.83 | 3.63 | 0.786 | 56.00 | −0.78 | −0.46 | 35.70 |
| 2.83 | 2.60 | 0.812 | 56.70 | −0.81 | −0.6 | 35.69 |
| 4.75 | 1.72 | 0.793 | 56.91 | −0.78 | −0.72 | 45.51 |
| 6.83 | 1.18 | 0.802 | 55.58 | −0.77 | −0.38 | 40.25 |
| 12.75 | 0.84 | 0.798 | 57.65 | −0.78 | −1.04 | 40.15 |
| 14.50 | 0.79 | 0.797 | 57.36 | −0.78 | −0.72 | 37.84 |
| 16.42 | 0.69 | 0.803 | 57.91 | −0.81 | −0.61 | 40.64 |
| 18.25 | 0.63 | 0.816 | 57.85 | −0.75 | −0.77 | 41.98 |
| 21.00 | 0.65 | 0.815 | 57.88 | −0.77 | −1.00 | 41.06 |

TABLE 6

Polymer 3 at 150° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 19.83 | 0.800 | 68.21 | −1.78 | −2.17 | 33.74 |
| 1.00 | 16.94 | 0.794 | 68.39 | −1.74 | −2.20 | 37.90 |
| 2.08 | 12.38 | 0.806 | 69.12 | −1.71 | −2.20 | 33.55 |
| 3.00 | 9.61 | 0.807 | 68.98 | −1.74 | −2.17 | 33.93 |
| 4.00 | 7.37 | 0.744 | 69.21 | −1.68 | −2.13 | 33.15 |
| 5.08 | 6.41 | 0.854 | 69.23 | −1.65 | −2.20 | 34.67 |

TABLE 6-continued

Polymer 3 at 150° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 6.08 | 4.72 | 0.848 | 69.26 | −1.71 | −1.99 | 34.29 |
| 8.00 | 3.26 | 0.791 | 69.02 | −1.68 | −2.09 | 31.14 |
| 13.67 | 1.44 | 0.796 | 69.65 | −1.64 | −2.20 | 39.72 |
| 16.00 | 1.17 | 0.809 | 69.83 | −1.65 | −2.27 | 44.10 |
| 18.00 | 1.02 | 0.840 | 69.45 | −1.65 | −2.21 | 37.24 |
| 20.00 | 0.91 | 0.835 | 69.59 | −1.65 | −2.15 | 38.29 |
| 21.67 | 0.84 | 0.792 | 69.83 | −1.62 | −2.13 | 31.35 |
| 22.00 | 0.81 | 0.840 | 69.69 | −1.64 | −2.10 | 46.21 |
| 24.00 | 0.79 | 0.791 | 69.76 | −1.64 | −2.15 | 39.03 |

TABLE 7

Polymer 3 at 185° C. and 0.0067 SCFM

| Elapsed Time (hr) | Residual Acetaldehyde (ppm) | It.V. (dl/g) | L* | a* | b* | % Crystallinity |
|---|---|---|---|---|---|---|
| 0.00 | 18.01 | 0.840 | 67.86 | −1.61 | −2.45 | 27.28 |
| 1.00 | 13.81 | 0.831 | 68.95 | −1.63 | −2.37 | 29.90 |
| 2.00 | 4.76 | 0.825 | 70.29 | −1.50 | −2.21 | 29.10 |
| 3.00 | 2.09 | 0.813 | 71.15 | −1.46 | −2.14 | 31.60 |
| 5.00 | 1.51 | 0.830 | 71.45 | −1.45 | −1.96 | 27.64 |
| 7.00 | 1.27 | 0.836 | 71.60 | −1.43 | −1.80 | 34.25 |
| 10.00 | 1.05 | 0.844 | 71.12 | −1.40 | −1.81 | 34.23 |
| 14.00 | 0.81 | 0.849 | 71.87 | −1.38 | −1.64 | 35.58 |
| 18.00 | 0.57 | 0.859 | 71.98 | −1.38 | −1.49 | 36.54 |
| 23.00 | 0.38 | 0.880 | 71.95 | −1.35 | −1.37 | 37.30 |

The results indicated that for all temperatures tested, 150° C., 160° C., and 185° C., the level of residual acetaldehyde remaining after 24 hours was less than 3 ppm for all samples tested. When the process was conducted at 185° C., an increase in molecular weight was observed due to the polycondensation reactions occurring at this high temperature. Also, at 185° C., a significant increase in L* was observed, and an increase in the a* and b* color value were also observed. However, when the process temperature was lowered to below 160° C., no significant change in the molecular weight, L*, a* or b* was observed. Based upon the experimental observations, one may conclude that residual acetaldehyde formed during the melt phase polymerization of PET may be effectively removed by exposing the resin to a flow of gas at a temperature which does not significantly affect the fitness of the particles for its desired use as indicated by insubstantial changes in the It.V., L*, or b* color values of the particles. The finding that the b* color value can remain unchanged in the presence of atmospheric oxygen is an important consideration because in solid state polymerization operations, great care is taken to minimize the concentration of oxygen to prevent changes in b* color at the high temperature conditions.

What we claim is:

1. A process comprising introducing polyester polymer particles at a temperature within a range of 130° C. to 195° C. and containing residual acetaldehyde into a vessel to form a bed of particles within the vessel, flowing a gas through at least a portion of the particle bed at a gas flow rate not exceeding 0.15 standard cubic feet per minute (SCFM) per pound of particles per hour, and withdrawing finished particles from the vessel having a reduced amount of residual acetaldehyde and an It.V. of at least 0.70 dL/p.

2. The process of claim 1, wherein the particles introduced into the vessel have an It.V. of at least 0.70 dL/g, and contain an amount of residual acetaldehyde in excess of 10 ppm.

3. The process of claim 1, wherein the particles introduced into the vessel comprise polyester polymers polymerized in a melt phase to an It.V. of at least 0.72 dL/g.

4. The process of claim 3, wherein the particles have a degree of crystallinity of at least 25% before being exposed to the flow of gas.

5. The process of claim 1, wherein the finished particles are introduced into a dryer to form dried particles, wherein the finished particles dried in the dryer have not been solid state polymerized.

6. The process of claim 1, wherein the finished particles are loaded into a shipping container and have not been solid state polymerized prior to loading into the container.

7. The process of claim 1, wherein the finished particles have a residual amount of acetaldehyde of less than 5 ppm.

8. The process of claim 1, wherein the particles introduced into the vessel comprise polyester polymers polymerized in a melt phase to an It.V. of at least 0.72 dL/g, the particles have a degree of crystallinity of at least 25% prior to introducing the particles into the zone, the particles are continuously fed into the zone without first solid state polymerizing the particles, and the finished particles have a residual acetaldehyde amount of 7 ppm or less.

9. The process of claim 1, wherein the gas has a nitrogen content of less than 85% by volume.

10. The process of claim 1, wherein the gas is introduced at a temperature of 70° C. or less.

11. The process of claim 10, wherein the gas is introduced at a temperature of 50° C. or less.

12. The process of claim 1, wherein the process is continuous.

13. The process of claim 12, wherein the vessel has a particle inlet, a particle outlet, a gas inlet, a gas outlet, and a particle bed within the vessel, and the gas is introduced into the vessel through the gas inlet and exits through the gas outlet after flowing through at least a portion of the particle bed, and the particles are introduced into the particle inlet and finished particles are discharged from the vessel through the particle outlet.

14. The process of claim 13, wherein the gas inlet and the finished particle outlet are located below the gas outlet and the particle inlet, the gas is introduced into the particle bed at any point below ½ of the particle bed, the particles introduced into the particle inlet form a bed and move by gravity to form a flow in a direction towards the bottom of the vessel while the gas flows countercurrent to the direction of the particle flow.

15. The process of claim 13, wherein the vessel has an aspect ratio L/D of at least 4.

16. The process of claim 13, wherein the pressure within the vessel measured at the gas inlet/vessel junction ranges from 0 psig to 10 psig.

17. The process of claim 1, wherein the process is continuous, the particles are fed to the vessel at a feed rate, and for each pound of particles fed per hour, the flow rate of the introduced gas is at least 0.005 SCFM.

18. The process of claim 17, wherein the flow rate is not greater than 0.10 SCFM.

19. The process of claim 18, wherein the flow rate is no greater than 0.05 SCFM.

20. The process of claim 19, wherein the residence time of the particles in the stripping zone ranges from 10 hours to 36 hours.

21. The process of claim 1, wherein the gas is nitrogen.

22. The process of claim 21, wherein the It.V. of the particles introduced into the vessel comprise polyester polymers polymerized in a melt phase to an It.V. of at least 0.72 dL/g.

23. The process of claim 22, wherein the finished particles have 5 ppm or less acetaldehyde without solid state polymerizing the polymer.

24. The process of claim 1, wherein the residual acetaldehyde content of the particles fed to the vessel is greater than 10 ppm, and the amount is reduced to 10 ppm or less in the finished particles.

25. The process of claim 1, wherein the residual acetaldehyde content of the particles fed to the vessel is greater than 20 ppm, and the amount is reduced to 5 ppm or less in the finished particles.

26. The process of claim 1, wherein the polyester polymer particles are fed to the vessel through a particle inlet, and the It.V. differential, defined as finished particle It.V.–feed particle It.V., is less than +0.025 dL/g.

27. The process of claim 26, wherein the It.V. differential is +0.020 dL/g or less.

28. The process of claim 27, wherein the It.V. differential is +0.015 dL/g or less.

29. The process of claim 1, wherein the polyester polymer particles are fed to the vessel through a particle inlet, and the L* color differential defined as (finished particle L* color–feed particle L* color) is less than 5.

30. The process of claim 29, wherein the L* color differential is 3 or less.

31. The process of claim 1, wherein the polyester polymer particles are fed to a vessel through a particle inlet, and the b* color value of the finished particles is less than the b* color value of the particles fed to the vessel, or is greater than the b* color value of the particles fed to the vessel by no more than 1.0, or remains unchanged.

32. The process of claim 31, wherein the b* remains unchanged or is less than the b* color value of the particles fed to the vessel.

33. The process of claim 1, wherein the particles are pellets.

34. The process of claim 1, wherein the polyester polymer comprises:
   (a) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
   (b) a hydroxyl component comprising at least 60 mole % of the residues of ethylene glycol or propane diol, based on 100 mole percent of carboxylic acid component residues and 100 mole percent of hydroxyl component residues in the polyester polymer.

35. The process of claim 1, wherein the acid component comprises the residues or terephthalic acid in an amount of at least 92 mole % and ethylene glycol in an amount of at least 92 mole %.

36. A process comprising:
   (a) crystallizing polyester polymer particles to produce a hot stream of crystallized polyester polymer particles having an average degree of crystallinity of at least 25%, residual acetaldehyde, and having a particle temperature in excess of 90° C.,
   (b) continuously feeding into a vessel the hot stream of crystallized polyester polymer particles at a particle temperature of at least 130° C. before the temperature of the hot stream drops below 50° C. between the production of said crystallized polyester polymer particles and the vessel, and
   (c) feeding a flow of gas into the vessel and through at least a portion of the stream of particles at a gas flow rate not exceeding 0.15 SCFM per pound of particles per hour to form a stream of finished polyester polymer particles having a reduced amount of residual acetaldehyde relative to the amount of residual acetaldehyde prior to entry into the vessel and having an It.V. of at least 0.70 dL/g.

37. The process of claim 36, wherein the temperature of the hot stream is in excess of 130° C.

38. The process of claim 37, wherein the hot stream is introduced into the vessel before the temperature of the stream drops below 90° C.

39. The process of claim 38, wherein the average degree of crystallinity is at least 30%.

40. The process of claim 1, wherein the polyester polymer particles are introduced into the vessel continuously.

41. The process of claim 26, wherein the It.V. differential is –0.02 dL/g or more.

42. The process of claim 27, wherein the It.V. differential is –0.02 dL/g or more.

43. A process comprising introducing polyester polymer particles at a temperature within a range of 130° C. to 195° C. and containing residual acetaldehyde into a vessel to form a bed of particles within the vessel, flowing a gas through at least a portion of the particle bed, and withdrawing finished particles from the vessel having a reduced amount of residual acetaldehyde and an It.V. of at least 0.70 dL/g, wherein said gas is introduced into said vessel at a temperature of 70° C. or less.

44. The process of claim 43, wherein said gas is introduced into the vessel at a temperature of 60° C. or less.

45. The process of claim 44, wherein said gas is introduced into the vessel at a temperature of 50° C. or less.

46. The process of claim 45, wherein said gas is introduced into the vessel at a temperature of 40° C. or less.

47. The process of claim 46, wherein said gas is introduced into the vessel at about ambient air temperature.

48. The process of any one of claims 43-47, wherein the gas flow rate is less than 0.05 SCFM per pound of particles per hour.

49. The process of any one of claims 43-47, wherein the finished particles are introduced into a dryer to form dry particles fed to a melt processing zone.

50. The process of any one of claims 43-47, wherein the finished particles are fed to a melt processing zone, and the finished particles have not been solid state polymerized.

51. The process of claim 43, wherein the finished particles are loaded into a shipping container and have not been solid state polymerized prior to loading into the container.

52. The process of claim 51, wherein the finished particles have a residual acetaldehyde amount of less than 5 ppm.

53. The process of claim 43, wherein the process is continuous.

54. The process of claim 43, wherein the vessel has a particle inlet, a particle outlet, a gas inlet, a gas outlet, and a particle bed within the vessel, wherein the gas inlet and the finished particle outlet are located below the gas outlet and the particle inlet, and the gas is introduced into the particle bed at any point below one-half of the distance of the particle bed, and the particles that are introduced into the particle inlet form a bed and move by gravity to form a flow in a direction towards the bottom of the vessel while the gas flows countercurrent to the direction of the particle flow.

55. The process of claim 43, wherein the gas is ambient air.

56. The process of claim 43, wherein the finished particles have 5 ppm or less acetaldehyde without solid state polymerizing the polymer.

57. The process of claim 43, wherein the residual acetaldehyde in the particles fed to the vessel is greater than 20 ppm.

58. The process of claim 43, wherein the particles introduced into the vessel (feed particles) and the finished particles have an It.V., and the It.V. differential, defined as $$\text{finished particle It.V.} - \text{feed particle It.V.}$$

is −0.02 dL/g or more.

59. The process of claim 58, wherein the It.V. differential is +0.105 dL/g or less.

60. The process of claim 43, wherein said gas is nitrogen gas.

61. The process of claim 1, wherein the crystallized polyester polymer particles comprise strain crystallized particles.

* * * * *